(12) United States Patent
Bertaso et al.

(10) Patent No.: US 8,905,675 B2
(45) Date of Patent: Dec. 9, 2014

(54) METHOD OF MANUFACTURING A MECHANICALLY LINED PIPE

(75) Inventors: Daniel Bertaso, Aberdeen (GB); John Hamilton, Portlethen Aberdeenshire (GB); Sylvain Denniel, Aberdeen Aberdeenshire (GB); Brett Howard, Banchory Aberdeenshire (GB); Tomasz Tkaczyk, Westhill Aberdeenshire (GB); Aurélien Pepin, Aberdeen Aberdeenshire (GB)

(73) Assignee: Technip France (FR)

(*) Notice: Subject to any disclaimer, the term of this patent is extended or adjusted under 35 U.S.C. 154(b) by 250 days.

(21) Appl. No.: 13/518,162

(22) PCT Filed: Dec. 8, 2010

(86) PCT No.: PCT/GB2010/052049
§ 371 (c)(1),
(2), (4) Date: Mar. 1, 2013

(87) PCT Pub. No.: WO2011/077110
PCT Pub. Date: Jun. 30, 2011

(65) Prior Publication Data
US 2013/0195557 A1 Aug. 1, 2013

(30) Foreign Application Priority Data
Dec. 22, 2009 (GB) .................................. 0922286.0

(51) Int. Cl.
*F16L 1/12* (2006.01)
*F16L 9/19* (2006.01)
*F16L 9/18* (2006.01)
*G01M 3/02* (2006.01)
*F16L 1/20* (2006.01)
*F16L 58/08* (2006.01)
*B21C 37/15* (2006.01)

(52) U.S. Cl.
CPC ... *F16L 1/12* (2013.01); *F16L 9/20* (2013.01); *F16L 9/18* (2013.01); *G01M 3/02* (2013.01); *F16L 1/203* (2013.01); *F16L 58/08* (2013.01); *B21C 37/154* (2013.01)
USPC ....................... 405/168.3; 138/137; 405/184.2

(58) Field of Classification Search
CPC .................. F16L 1/12; F16L 9/18; F16L 9/20; B21C 37/154; G01M 3/02
USPC ............. 405/168.3, 169, 170, 184.2; 138/137
See application file for complete search history.

(56) References Cited

U.S. PATENT DOCUMENTS 3,959,424 A * 5/1976 Dawson et al. ................ 264/516
4,332,073 A 6/1982 Yoshida ........................... 29/421

(Continued)

FOREIGN PATENT DOCUMENTS

CA 2 672 210 A1 6/2008
EP 0 150 041 7/1985

(Continued)

OTHER PUBLICATIONS

UK Search Report dated Apr. 19, 2010, issued in corresponding UK Patent Application No. GB0922286.0. Total 2 pages.
International Search Report dated Apr. 18, 2011 issued in corresponding international patent application No. PCT/GB2010/052049.

(Continued)

*Primary Examiner* — Tara M Pinnock
(74) *Attorney, Agent, or Firm* — Ostrolenk Faber LLP (57) ABSTRACT

A method of manufacturing a mechanically lined pipe (MLP) having an outer pipe and an inner liner comprising at least the steps of: (a) forming the outer pipe as a single length; (b) forming an inner liner former being wholly or substantially the same length as the outer pipe of step (a); (c) locating the inner liner former of step (b) within the outer pipe; and (d) expanding the inner liner former within the outer pipe to form the MLP.

25 Claims, 4 Drawing Sheets

(56) References Cited

U.S. PATENT DOCUMENTS

| | | | |
|---|---|---|---|
| 4,334,345 A | 6/1982 | Jenks | 29/157 |
| 4,449,281 A * | 5/1984 | Yoshida et al. | 29/421.1 |
| 4,872,519 A | 10/1989 | Kopecki | 175/320 |
| 4,883,292 A * | 11/1989 | Kuroki | 285/55 |
| 5,135,698 A | 8/1992 | Salama et al. | |
| 5,988,691 A | 11/1999 | Cruickshank | |
| 6,167,913 B1 | 1/2001 | Wood | 138/98 |
| 7,270,150 B2 * | 9/2007 | Warren | 138/98 |
| 7,722,085 B2 * | 5/2010 | Pionetti | 285/55 |
| 2005/0166987 A1 | 8/2005 | Matsubara et al. | |

FOREIGN PATENT DOCUMENTS

| | | |
|---|---|---|
| GB | 2 275 639 | 9/1994 |
| JP | 55-117516 | 9/1980 |
| WO | WO 97/34101 A1 | 9/1997 |
| WO | WO 2004/015321 | 2/2004 |
| WO | WO 2008/072970 A1 | 6/2008 |

OTHER PUBLICATIONS

International Preliminary Report on Patentability issued in corresponding international patent application No. PCT/GB2010/052049.

* cited by examiner

METHOD OF MANUFACTURING A MECHANICALLY LINED PIPE

CROSS REFERENCE TO RELATED APPLICATION

The present application is a 35 U.S.C. §371 National Phase conversion of PCT/GB2010/052049, filed Dec. 8, 2010, which claims benefit of United Kingdom Application No. 0922286.0, filed Dec. 22, 2009, the disclosure of which is incorporated herein by reference. The PCT International Application was published in the English language.

TECHNICAL FIELD

The present invention relates to a method of manufacturing a mechanically lined pipe, and optionally methods of subsequently laying a mechanically lined pipeline formed from such pipes, particularly but not exclusively to provide a marine pipeline.

BACKGROUND OF THE INVENTION

Corrosion resistance pipelines for the marine or otherwise underwater transportation or conveying of corrosive fluids such as gas or crude oil can be provided by pipes having an internal metallic liner. A double-walled or bi-metallic pipe is generally composed of two metallic layers. The outer layer is for resisting hydrostatic pressure, and/or internal pressure depending on the water depth, whilst the internal layer prevents damage to the outer layer from the chemical composition of the fluid being conveyed. The inner layer is sometimes also termed a "liner". As one of its main purposes is to protect the outer layer from corrosion, commonly a corrosion resistant alloy (CRA) is chosen for the liner.

One form of bi-metallic pipe is a single "clad" pipe having an internal CRA layer metallurgically bonded to the outer layer, which could be formed from a carbon steel base metal.

A second form of bi-metallic pipe can be termed a mechanically lined pipe (MLP) formed from a number of pipe stalks in which a liner is fixed to the outer layer such as carbon steel without metallurgical bonding. An economic method of forming a lined pipe stalk in this way uses hydraulic expansion, where the liner is inserted into the outer layer, and then both parts are expanded. During the expansion, the inner layer undergoes a plastic deformation while the outer layer undergoes either an elastic or a plastic deformation, depending on the manufacturing process. One example of this comprises inserting an alloy 316L clad liner inside a carbon steel host pipe, and expanding the liner radially so that it comes into contact with the host pipe, and then the host pipe outer diameter will also expand together with the liner to a pre-determined strain level such that, following relaxation of the internal pressure, an interference contact stress between the liner and the host pipe remains.

Such bi-metallic pipe stalks are generally manufactured in 12 m or 24 m lengths at a manufacturing location, and then subsequently transported to a base or site next to a river or sea for welding together into conventionally 'standard' 1 km lengths.

However, corrosion can occur on the inner surface of the outer host pipe layers during the transportation and storage of such pipe stalks before use. Various manufacturers and suppliers of such pipe stalks have different ways of overcoming this, although the commonest method involves welding each end of the inner liner to the ends of the outer pipe to seal them. For example, the steel pipe shown in EP0150041A2 has a double construction in which an outer carbon steel pipe member is lined with respect to its whole length with a corrosion resisting material consisting of Ti.

The bi-metallic pipe stalks are conventionally transported and assembled on site at a spool base by the completion of circumferentially butt-welds between the pipe stalks. The material used to perform the welds is generally the same as the material used for the inner liners to ensure continuity of the liner material in the region of the welds. Thus, for example, when a corrosion resistant alloy is selected for the inner liner for an application in the sour service (i.e. in environments containing elemental sulfur), it is important that the property of the liner material is maintained all along the length of the liner. For this reason, all the welds of such 12 m or 24 m bi-metallic pipes are carried out with consumables formed from the corrosion resistant alloy material.

However, such consumables are higher in cost than other types of consumables, such as those formed only from carbon steel. Moreover, during the stalk-welding process, the materials used for the inner liner and the outer host pipe can mix and form an alloy. Thus, the integrity of the inner liner may not be maintained at all the weld locations despite the use of consumables of the same material of the inner liner. Any loss in integrity anywhere along the pipeline is of course catastrophic for the whole pipeline.

EP0150041A2 proposes a method of manufacturing corrosion resisting steel pipes of "limited" lengths after pipe-manufacturing and transportation to a building site, based on using end tubes so that a Ti metal overlaps the outer pipe members prior to welding.

GB2275639A describes welding its bi-metallic tubular members to form a pipe so that the butt welds formed do not contact the outer layers, followed by the addition of circumferentially lap welding sleeves around each weld not contacting the inner layers.

Such welding processes still take time and involve more complicated welding processes and additional materials such as sleeves than is desired in practice in order to avoid one or more of the above problems.

SUMMARY OF THE INVENTION

One object of the present invention is to provide a simpler method of manufacturing a mechanically lined pipe.

According to a first aspect of the present invention, there is provided a method of manufacturing a mechanically lined pipe (MLP) having an outer pipe and an inner liner comprising at least the steps of:
(a) forming the outer pipe as a single length;
(b) forming an inner liner former being wholly or substantially the same length as the outer pipe of step (a);
(c) locating the inner liner former of step (b) within the outer pipe; and
(d) expanding the inner liner former within the outer pipe to form the MLP.

In this way, the conventional need to overcome problems with welding a number of pre-formed 12 m or 24 m bi-metallic pipe stalks to form a 1 km bi-metallic pipe are avoided, thus also avoiding weaknesses that can be a part of conventional stalk-welding processes for forming an MLP.

The method of manufacturing a mechanically lined pipe (MLP) according to the present invention can provide a mechanically lined pipe of any length, generally being at least 5, 10 or 20 times longer than conventional pipe stalks of 12 m or 24 m lengths.

Thus, according to one embodiment of the present invention, the method of the present invention provides an MLP which is >500 m long, optionally in the range 800-1200 m long and preferably wholly or substantially 1 km long. Presently, marine pipes being 1 km long are the generally standard size used to subsequently form a pipeline, especially a pipeline for laying under water or otherwise for use in a marine environment, and generally being at least several kilometres long.

Mechanically lined pipes can be formed with any number of layers, liners, coating etc., known in the art, but including at least one 'outer layer' or 'outer pipe', such as a carbon steel outer pipe, fixed to at least one 'inner layer' or 'liner', one such liner preferably being formed from a corrosion resistant alloy (CRA), for example a clad liner such as an alloy 316L, 825, 625 or 904L, without metallurgical bonding.

The outer pipe for the MLP can be formed as a single length using a number of known processes, including continuous forming as a single piece or by welding a plurality of outer pipe stalks together. For example, carbon steel pipe stalks are easily manufacturable, and can be easily and quickly welded together using carbon steel consumables in a manner known in the art. Welding pipe stalks formed only of carbon steel is a significantly simpler process than welding pipe stalks of bi-metallic materials, especially as it avoids any mixing of different materials forming new alloys.

Similarly, the forming of an inner liner former being wholly or substantially the same length as the outer pipe, such as being >500 m long, optionally in the range 800-1200 m, and preferably wholly or substantially 1 km long, could be provided by a number of processes known in the art, including continuous forming.

The location of the inner liner former within the outer pipe can be carried out as a simple mechanical step of inserting the inner liner former into the host outer pipe length using one or more simple mechanical operations.

The expanding of the inner liner former within the outer pipe to form the final shape and form of the inner liner and hence MLP can be provided by any one of a number of conventional methods, including one or more mechanical processes and/or one or more hydraulic processes.

Mechanical expansion processes include passing an expander through the pipe length so as to expand the inner liner former to meet the inner surface of the host outer pipe. A hydraulic process can be the use of pressurized water passing through the pipe length, such as carried out during hydrotesting at a pressure in the range 20-50 MPa for example, which testing is carried out in accordance with known standard procedures.

According to one embodiment of the present invention, the method further comprises the step of coating the so-formed MLP, in particular the outer wall of the outer host pipe, with one or more coatings known in the art.

The method of manufacturing according to the present invention provides a mechanically line pipe (MLP) of a substantial length, optionally but not limited to 1 km long, such that the present invention extends to a mechanically lined pipe whenever formed according to a method as described hereinabove.

The MLP is preferably formed/manufactured/assembled at a spoolbase, generally where the MLP is spooled onto a reel. Generally this is onshore or at an onshore location, optionally where the outer pipe and/or inner liner is formed, preferably to form an MLP which is >500 m long, and is ready for laying, preferably as part of a longer (generally many kilometres) pipeline.

According to another aspect of the present invention, there is provided a method of manufacturing a mechanically lined pipeline (MLPL) comprising conjoining a plurality of mechanically lined pipes (MLPs) as defined hereinabove. Generally, the conjoining is provided by welding a plurality of consecutive mechanically lined pipes, for example each being 1 km long, by the use of one or more pipeline-welding processes.

One example of a pipeline-welding process to provide girth welds between two consecutive MLPs comprising welding using consumables of the same material as the inner liner material. Although inner liner material is usually more expensive than outer pipe material, this process only requires welding every pipe length (for example every 1 km), rather than every 12 m or 24 m pipe stalk length.

A second pipeline-welding process involves welding consecutive outer pipes together using consumables of the same outer pipe material, such as carbon steel, followed by internal pipeline welding of consecutive inner liners. To assist avoiding any mixing of welding materials to form non-desired alloys, the inner liners of consecutive pipes could be cut back to allow clean outer pipe welding, and the internal welding can then be carried out cleanly between the two inner liners to avoid the already formed outer pipe welds.

According to a further aspect of the present invention, there is provided a mechanically lined pipeline whenever formed according to one or more of the methods of manufacturing a mechanically lined pipeline as described above.

The methods of manufacturing described herein above are not limited to the size, shape, design, physical and/or chemical properties of the outer pipe and/or inner liner, and currently, the maximum wall thickness of a conventional MLP liner does not exceed 3.0 mm.

According to a further embodiment of the present invention, the MLP comprises a clad liner, and the clad liner has a thickness >2.5 mm, preferably ≥3 mm.

According to one particular embodiment of the present invention, the clad liner has a thickness defined by the formula (I):

$$D/t + 1406\, D/R = 96.1 \qquad (I)$$

wherein:
D is the clad liner diameter;
R is the smallest bending radius of the reel; and
t is the thickness of the clad liner.

The bending radius of a reel can be as low as 1.5 m, and go up to 10 m or more. The radius of the reel and spooled pipe obviously increases as the pipe is reeled onto the reel. One typical example of a reel for laying a marine pipeline has a smallest reel bending radius of 8.23 m.

According to one particular embodiment of the present invention, the clad liner has a thickness at least equal to the minimum liner thickness "t" calculated by formula (II):

$$t = a_{00}(\epsilon D^{0.75})^0 g^0 + a_{01}(\epsilon D^{0.75})^0 g^1 + a_{10}(\epsilon D^{0.75})^1 g^0 + a_{11}(\epsilon D^{0.75})^1 g^1 + a_{20}(\epsilon D^{0.75})^2 g^0 + a_{21}(\epsilon D^{0.75})^2 g^1 + 0.16 \qquad (II)$$

wherein:
t is the minimum liner thickness in mm:
$a_{00}$, $a_{01}$, are constants defined by Table 1:

TABLE 1

| ij | $a_{ij}$ |
|----|----------|
| 00 | 2.39846 |
| 01 | −0.239488 |
| 10 | −5.48161 |
| 11 | 2.35153 |
| 20 | 6.50598 |
| 21 | −1.37840 |

ε is the maximum reeling strain, g is the radial insertion gap in mm, and $D = D_H - 2 t_H$ is the liner outer diameter in mm, where $D_H$ and $t_H$ are respectively the outer diameter and wall thickness of the host or outer pipe of the MLP in mm.

One or both of above formulae can provide the minimum wall thickness of a liner for a given liner diameter (which is also approximately equal to the inner diameter of the outer or host pipe) and a reel radius. The MLP can then be designed and manufactured according to the formula(e), such that it can then be directly loaded onto a reel in a conventional manner without requiring any internal pressure either fully or in sections thereof.

There are two common methods of laying underwater or marine pipelines. The so-called 'stove piping method' involves assembling pipes on a marine pipe-laying vessel, and then welding each one as the laying progresses. In the so-called 'reeled laying method', the pipeline is assembled onshore from a number of pipe lengths, and then directly spooled onto a large reel, sometimes also termed a storage reel or drum. Once offshore, the pipeline is unwound from the reel as a single entity and is directly available for laying because no welding is required during the offshore operation.

The reeled laying method is faster and more economical than the stove piping method, such that it is preferred where possible. However, the reeling process obviously generates significant bending on the pipeline, which would cause a conventional liner in a conventional lined pipeline to wrinkle, and it is currently considered that wrinkles are detrimental to an MLPL. Thus, all current methods developed to load an MLPL onto a reel have been based on the idea that the formation of any wrinkles should be avoided at all costs during the spooling processes.

For this reason, there are currently no actual uses or commercial applications of the reeled lay method for bi-metallic pipes, and any methods proposed for spooling an MLPL onto a reel involve maintaining a pressure inside the pipeline during the reeling/unreeling process.

For example, WO 2008/072970 A1 discloses a method for laying a pipeline having an inner corrosion proof metallic cladding that is closely fitted with metallic contact to an outer pipe material. In its method, a section of the pipeline is reeled onto a pipe laying drum whilst an overpressure is maintained within the section by means of a pressurised fluid. When the pipeline is motionless, the overpressure is relieved, and a further pipeline section is joined to the first section. A new overpressure is then applied within the sections, and the further section is reeled onto the pipe laying drum.

Whilst this method may assist in practice to avoid deformation when the pipeline sections have no "mechanical movement" (which is defined in WO 2008/072970 A1 as meaning reeling the pipeline onto or unwinding the pipeline from the pipe laying drum), this method requires the overpressuring and pressure-relieving steps every time two pipe sections are joined. The pipe laying drum is described in WO 2008/072970 A1 as typically having installed "many" prefabricated sections, creating significant multiplication of the overpressuring and pressure-relieving steps required.

It is another object of the present invention to provide simpler and practical methods of reel-laying an MLPL formed from MLPs formed as described hereinabove.

Thus, according to a further aspect of the present invention, there is provided a method of reel-laying a mechanically lined pipeline (MLPL) formed as described hereinabove, the method comprising at least the steps of:

(i) spooling the MLPL onto a reel in the complete or substantial absence of internal pressure above ambient pressure in the MLPL;

(ii) unspooling the MLPL from the reel; and (iii) straightening the unspooled MLPL of step (ii) to provide an MLPL for laying.

According to a yet further aspect of the present invention, there is provided a method of reel-laying a mechanically lined pipeline (MLPL) formed as described hereinabove, the method comprising at least the steps of:

(i) spooling the MLPL onto a reel resulting in the formation of wrinkles in the spooled MLPL;

(ii) unspooling the MLPL from the reel; and (iii) straightening the unspooled MLPL of step (ii) to provide an MLPL for laying.

After the laying in step (iii), the laid MLPL can be hydrotested to provide a laid MLPL wholly or substantially having wrinkles, resulting from manufacturing or installation process, <2 mm high.

By minimising the size of the wrinkles and/or particularly selecting the thickness of the inner liner (either as a former and/or once formed) of the MLP (and hence of the subsequently formed MLPL), the methods of reel-laying according to the present invention allow faster spooling and unspooling to be effected to provide faster and so more economical reel-laying of an MLPL. After the reeling process (spooling on, spooling off and associated straightening as required), the residual wrinkles in the MLPL formed during the reeling/unreeling processes may only have a height of <4 mm, which may be further decreased (optionally to <1 mm or even <0.5 mm) with pressure applied during a pre-commissioning operation such as hydrotesting.

In particular, the thickness of the inner liner is selected using Formula I and/or Formula II herein described, to allow a thicker than conventional inner liner to be used, the wrinkles in which (formed during spooling) are reduced to <2 mm after straightening out and pre-commissioning the unspooled and laid MLPL.

According to one embodiment of these methods of present invention, there is provided the step of:

(ii) unspooling the MLPL from the reel in the complete or substantial absence of internal pressure above ambient pressure in the MLPL.

Thus, the present invention can provide faster spooling or unspooling at ambient pressure within the MLPL without stopping for any internal pressuring steps.

Once a MLP is laid, it is commonly pre-commissioned, and another embodiment of the present invention comprises the step of:

(iv) pressurising the MLPL after laying the MLPL.

Preferably, step (iv) comprises hydrotesting the MLPL, more preferably at a or the maximum hydrotest pressure in accordance with DNV-OS-F101 (offshore standard, Det Norske Veritas, DNV-OS-F101, submarine pipeline systems, October 2007), and generally at a pressure in the range 20-50 MPa, more preferably in the range 30-40 MPa.

The present invention extends to a method comprising any combination of the above aspects and embodiments, such as to a combination of a method of manufacturing an MLP, forming an MLPL, and spooling and unspooling the MLPL onto and off a reel followed by pre-commissioning the MLPL as described above.

Thus, according to one particular embodiment of the present invention, there is provided a method of manufacturing and laying a mechanically lined pipeline (MLPL) in a marine environment and formed from a plurality of mechanically lined pipes (MLPs), the method comprising at least the steps of;

(a) forming the outer pipe of an MLP as a single length;

(b) forming an inner liner former of an MLP being wholly or substantially the same length as the outer pipe of step (a);

(c) locating the inner liner former of step (b) within the outer pipe;

(d) expanding the inner liner former within the outer pipe to form an MLP with an inner liner;

(e) conjoining a plurality of MLPs of step (d) to form an MLPL;

(f) spooling the MLPL onto a reel, preferably in the complete or substantial absence of internal pressure above ambient pressure in the MLPL;

(g) unspooling and straightening the spooled MLPL of step (f) to lay the MLPL in a marine environment; and optionally (h) hydrotesting the laid MLPL of step (g) to reduce any residual wrinkles in the MLPL, optionally to a height <6 mm, <4 mm, <2 mm, or <1 mm high, preferably <0.5 mm high.

Optionally, one or more wrinkle-removing processes are applied to the MLPL either before, during or after hydrotesting, such as in step (h) above. Such processes can be provided by known methods and apparatus, for example the use of an internal mandrel or the like passing along the MLPL length to reduce the wrinkles height to a size whereby subsequent hydrotest pressure can complete the removal of such wrinkles, generally by applying a vertical force on such wrinkles to diminish their height. Internal mandrels and the like can be moved or otherwise propelled along the MLPL using any known means including pigs, cables, etc.

The term "internal pressure" as used herein relates to the pressure within the MLPL during the method of spooling or unspooling such an MLPL onto or off a reel, during a whole or complete process thereof, as opposed to the spooling and/or unspooling processes involving one or more stopping instances or time periods requiring internal pressure or internal pressure changes for the bending or unbending of the MLPL.

The term "straightening" as used herein includes one or more processes or steps of unbending the spooled MLPL after it leaves the reel, and generally as it is delivered to its intended laying position or location. This can include one or more bending cycles, alignments and/or straightening steps, usually before the MLPL enters the marine environment. The reeled lay method generally involves at least the steps of aligning and/or straightening the MLPL through one or more trough tensioners.

It is known that the extent of wrinkles formed in spooling an MLPL depends on one or more of the following group: the interference contact stresses in the liner, the liner size, the radial insertion gap, liner yield strength, liner strain hardening, the tensile response of the liner material, the applied bending strain, and the number of reverse bending cycles. There are two reverse bending cycles during a typical reeling operation, and there may be as many as five bending cycles during a contingency re-reeling operation.

The severity of the bending strain will depend on the host pipe diameter and the bending radius will depend on the reel radius.

A high interference contact stress has a very beneficial effect on the liner wrinkling and may reduce or even prevent wrinkling of the liner, especially on the first application of bending. However it is known that it is very difficult to control the target interference contact stress during MLP manufacturing, and that a high variation of grip force is expected. Moreover it is known that the grip force may be released. A reduction of the grip force can also be expected during the application of the external coating of the MLP at a temperature of 250° C. due to high thermal expansion coefficient of materials used for liners compared to that of the carbon steel used for host pipe.

These embodiments of the present invention have been found to be realisable based on an analysis of increasing the wall thickness of the inner liner of the MLP to determine a minimum liner wall thickness that results in any residual wrinkles only having a height of no more than 4 mm, such as <2 mm, after the reeling (spooling and unspooling) and straightening and/or precommissioning steps of the MLPL; that is, the wrinkles formed during the reeling steps can be removed or their height reduced during the straightening and/or pre-commissioning of the MPLP, in-particular during hydrotesting.

The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements from any of the embodiments to describe additional embodiments.

BRIEF DESCRIPTION OF THE DRAWINGS

Embodiments of the present invention will now be described by way of example only, and with reference to the accompanying drawings in which.

DESCRIPTION OF PREFERRED EMBODIMENTS

The present invention provides a number of methods for manufacturing, spooling, unspooling, straightening and pre-commissioning a mechanically lined pipe and pipeline, preferably being part of a method of manufacturing, laying and commissioning a marine pipeline.

Figures 2, 3:
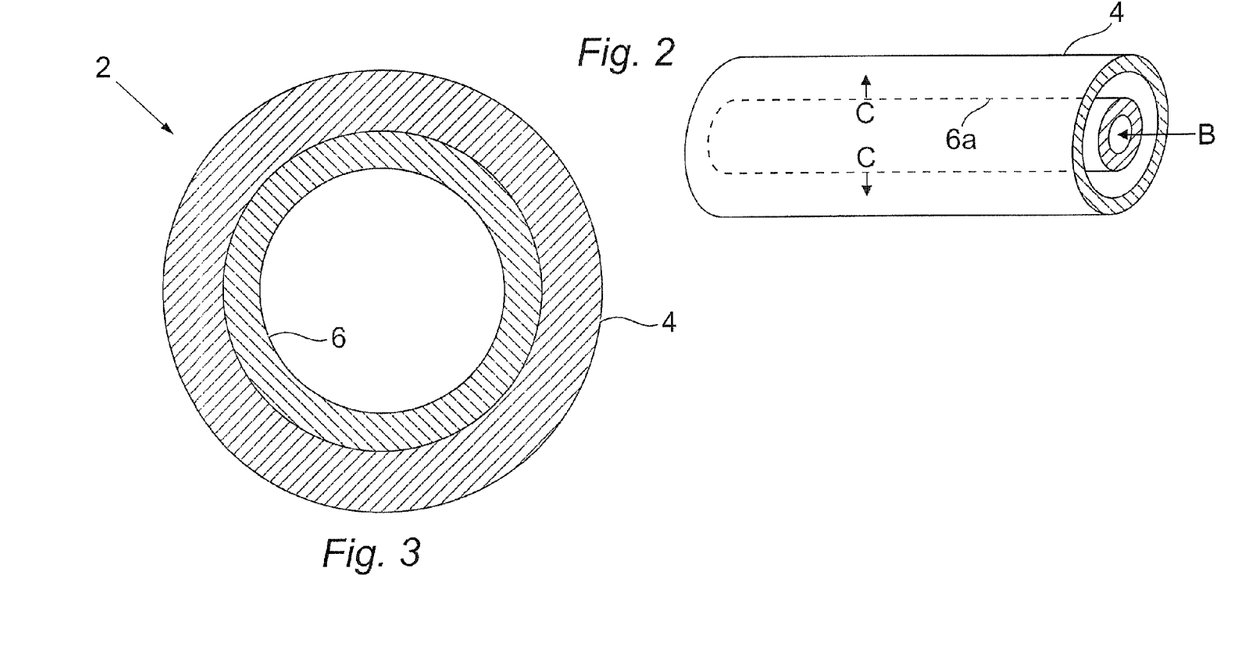
FIG. 2 is a diagrammatic view of a second step of a method of forming a mechanically lined pipe (MLP) according to one embodiment of the present invention.
FIG. 3 is a schematic cross-sectional view of an MLP formed according to an embodiment of the method shown in FIGS. 1 and 2.

Referring to the figures, FIG. 3 shows a schematic cross-sectional view of parts of a mechanically lined pipe (MLP) 2. The MLP 2 generally comprises a number of layers, only two of which are shown in FIG. 3 for clarity, comprising an outer pipe layer 4 which can be a carbon steel pipe, and an inner layer or liner 6 being formed from a corrosion resistant alloy, such as alloy 316L. The relative dimensions shown in FIG. 3 are not to scale, and are provided for clarity of representation.

Figure 1:
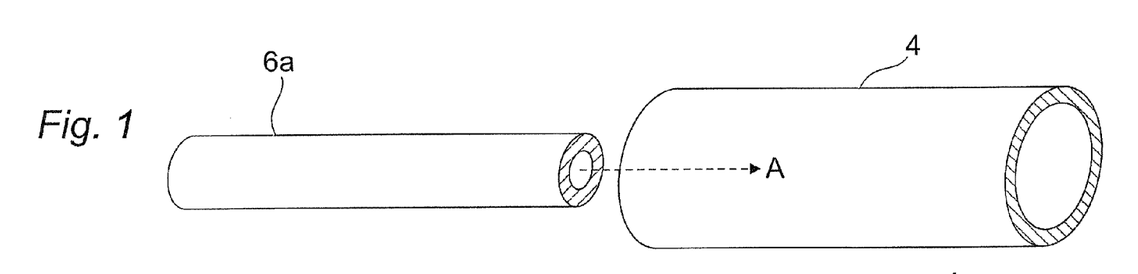
FIG. 1 is a diagrammatic view of one step of a method of forming a mechanically lined pipe (MLP) according to one embodiment of the present invention.

A method of manufacturing an MLP 2 having a length of at least 500 m, preferably wholly or substantially 1 km, is generally shown in FIGS. 1 and 2. FIG. 1 shows a formed outer pipe layer 4 which could be formed of carbon steel, and could be provided by welding together a number of outer pipe stalks of a shorter length, for example the conventional stalk length of 12 m or 24 m, made of carbon steel and welded together using carbon steel consumables. Only welding using one material, being the same material as the outer layer 4 material, significantly simplifies the conjoining of such outer layer pipe stalks to provide an outer pipe of the required length.

It is emphasised that the present invention relates to the forming and use of specific bi-metallic pipes, having a metallic liner rather than any form of plastic liner, and having an extensive length. This negates the use of easy thermoplastic liner deformation processes to form the bi-metallic pipes, as well as the use of short-length manufacturing processes such as peening and heating of the outer pipe.

FIG. 1 also shows an inner liner former 6a, being wholly or substantially the same length as the outer pipe layer 4. Such an inner liner former 6a could be formed using one or more conventional processes, and is preferably formed of a corrosion resistant material such as CRA. By being formed of a length being wholly or substantially the same length as the outer pipe layer 4, this not only avoids the need for forming a large number of separate inner liner formers of pipe stalk length, but also the need to carry out a large number of welding operations to weld all the inner liner formers together. This avoids the time required for such welding operations, and avoids the cost of using a large number of CRA consumables which are higher in cost than carbon steel consumables. It also avoids any root defects that may be formed during such welding operations.

FIG. 1 shows the locating of the inner liner former 6a within the outer pipe 4 following the direction of arrow A.

FIG. 2 shows the application of a suitable pressure, such as water pressure from hydrotesting, in the direction of arrow B into the inner liner former 6a so as to expand the inner liner former 6a circumferentially, and as generally shown by arrows C, to form interference contact stress between the two formed layers 4, 6 and hence their bonding together to form a mechanically lined pipe 2.

Figure 4:
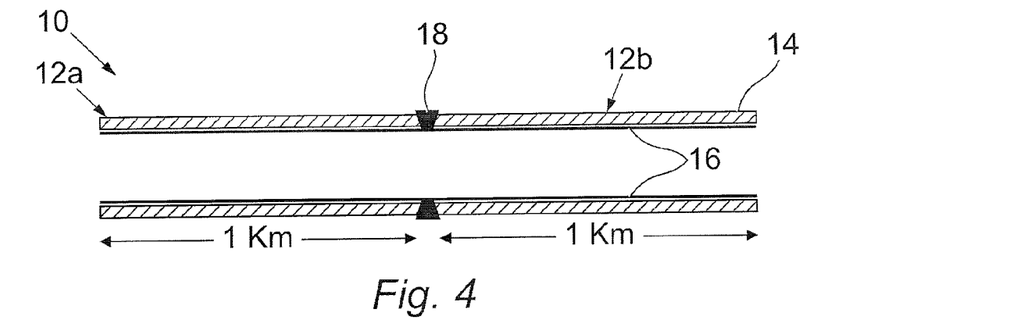
FIG. 4 is a schematic cross-sectional view of a first method of conjoining two consecutive MLPs.

FIG. 4 shows a first method of manufacturing a mechanically lined pipeline (MLPL) 10 comprising conjoining by welding a plurality of mechanically lined pipes (MLPs).

FIG. 4 shows two consecutive MLPs 12a, 12b such as those formed as described above in relation to FIGS. 1-3, each being 1 km long, and involving an outer host pipe 14 and an inner liner 16.

The first method comprises using consumables of the same material as the inner liner material to provide a girth weld 18 between the two consecutive MLPs 12a, 12b, so that at least the material of the inner liner is continuous along the consecutive MLPs 12a, 12b. This process can provide an MLPL 10 being a number of kilometres long ready for the reeled-lay method of laying a marine pipeline.

Figure 5A:
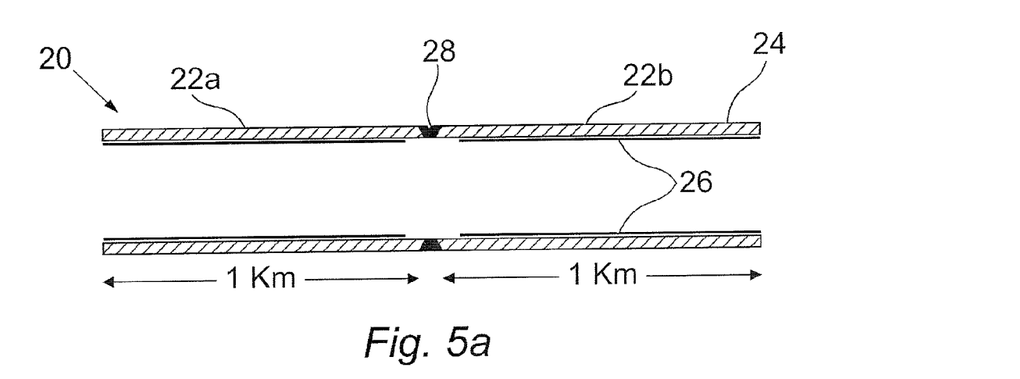
FIGS. 5a and 5b are schematic cross-sectional views of first and second steps of a second method of conjoining two consecutive MLPs.
Figure 5B:
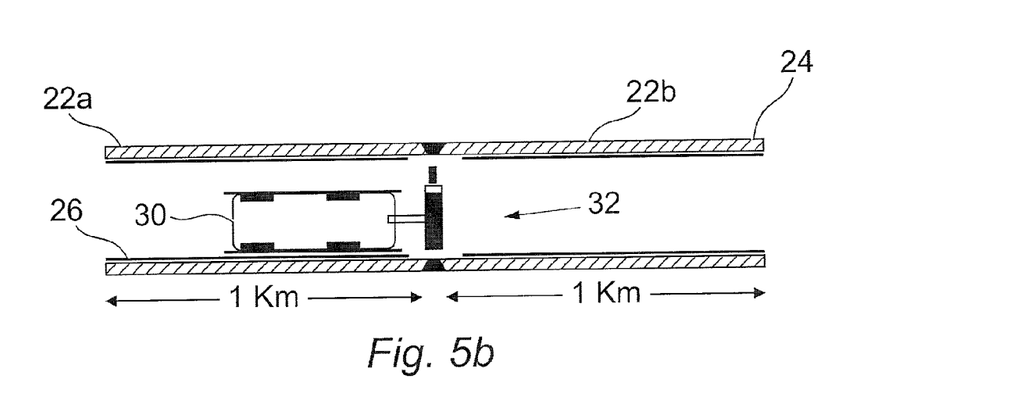

FIGS. 5a and 5b show a second method of manufacturing a mechanically line pipeline (MLPL) 20 comprising conjoining by welding a plurality of mechanically line pipes (MLPs) 22a, 22b, each having a host outer pipe 24 and inner liner 26.

FIG. 5a shows a first step of the second method, comprising bringing together two MLPs 22a, 22b, such as those formed as described above in relation to FIGS. 1-3, with the inner liner 26 being cut back by an amount such as by 20-30 mm, prior to circumferentially butt welding the host outer pipes 24, preferably using the same material as the outer pipe material, such as carbon steel consumables. This creates a carbon steel weld 28 between the MLPs 22a, 22b.

FIG. 5b shows the second step of the second method, wherein a welding machine 30 is inserted inside the MLPs 22a, 22b to conjoin the consecutive inner liners 26, generally by filling the span between the two inner liners 26, preferably with the same material as the inner liner material, such as corrosion resistant alloy. Such filling can be provided by a rotatable arm 32 able to circumferentially fill the span between the liners 26 as shown in FIG. 5b.

It is a particular advantage of both of these first and second methods as shown in FIGS. 4, 5a and 5b that only one material is used during each welding process, to minimise or avoid the possibility of the admixing of the outer pipe material and the inner liner material to form an alloy, which alloy could be a weakness in the MLPL which is naturally undesired.

In the conventional manufacture of an MLP, a <3 mm thick inner layer is provided into an outer layer and then expanded to provide an interference contact stress between the two layers. However, bending of a pipe formed from two such layers, such as reeling or spooling onto a reel, was assumed to create wrinkles which could not be removed after unspooling, and which were therefore considered to be sufficiently detrimental to the finally laid pipeline that the forming of any wrinkles should be avoided at all costs.

Thus, a high interference contact stress is desired between the inner and outer layers to prevent wrinkling of the inner liner compared with the outer layer. However, it is difficult to control the degree of intended interference contact stress during manufacturing of such pipes, and a high degree of variation of force occurs in practice. Moreover, an interference contact stress can be released on the application of the first bending. Thus, the art presently does not consider MLPLs formed from such MLPs are useable in the reeled lay method and complicated and time-delaying and stopping internal pressuring steps such as shown in WO2008/072970 have been proposed.

A surprising finding by the present applicants is that some (small, generally in the range 4-6 mm) wrinkling of the inner liner can be tolerated during bending of an MLPL formed from such MLPs, and that residual wrinkles being <2 mm high after the straightening of the MLPL can be subsequently reduced, preferably to <0.5 mm, when pressure is applied to the inside of the MLPL. Such a pressure could be applied during the pre-commissioning of a laid marine pipeline, for example during its hydrotesting.

Thus, the present invention is based on the ability to bend an MLPL, in particular onto and off a reel, wherein at the end of the process there are often no wrinkles or the residual wrinkles are not greater than 6 mm, often <4 mm high, after the subsequent steps of aligning and straightening the MLP. As the prior art methods for reeling an MLPL involve the use of internal pressure within the MLPL, it is a surprising advantage of the present invention to be able to provide a method of spooling an MLPL onto and/or off a reel in the complete or substantial absence of internal pressure above ambient pressure in the MLPL.

Figure 6:
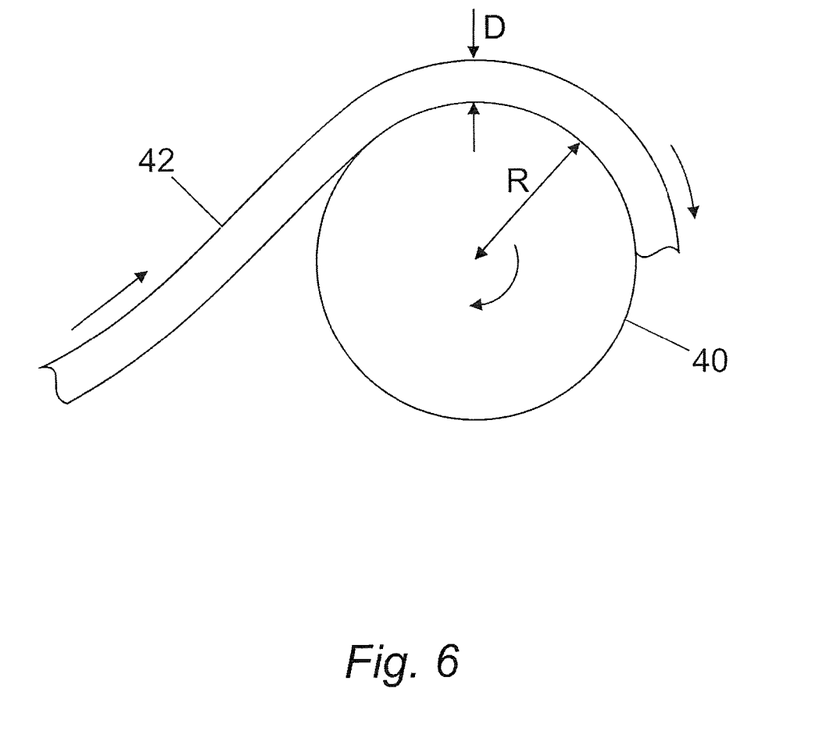
FIG. 6 is a diagrammatic cross-sectional view of a method of spooling an MLPL onto a reel.

FIG. 6 shows a diagrammatic reel 40 having a smallest bending radius "R", and a mechanically lined pipeline (MLPL) 42 having an outer pipe diameter "D". The MLPL may be formed according to one of the methods shown in FIGS. 4, 5a, 5b, i.e. the MLPL 10 or 20, and be several kilometres long. FIG. 6 shows spooling of the MLPL 42 onto the reel 40.

By way of example only, the reel 40 could have a bending radius R of 8.23 m, and the MLPL 42 could have a diameter D of 12.75 inches (323.9 mm) and a wall thickness of 15.9 mm. Where the inner liner is alloy 316L, the use of the formula (I):

$$D/t + 1406 \, D/R = 96.1 \tag{I}$$

as described above provides a thickness of the liner of 6.3 mm.

Formula (II) as described hereinabove also allows calculation of a minimum liner thickness.

The use of a 6.3 mm alloy liner in such an MLPL allows it to be spooled directly and simply in a single action onto an 8.23 m reel, in the knowledge that residual wrinkles formed between the liner and the outer layer after straightening will be <2 mm.

Figure 7:
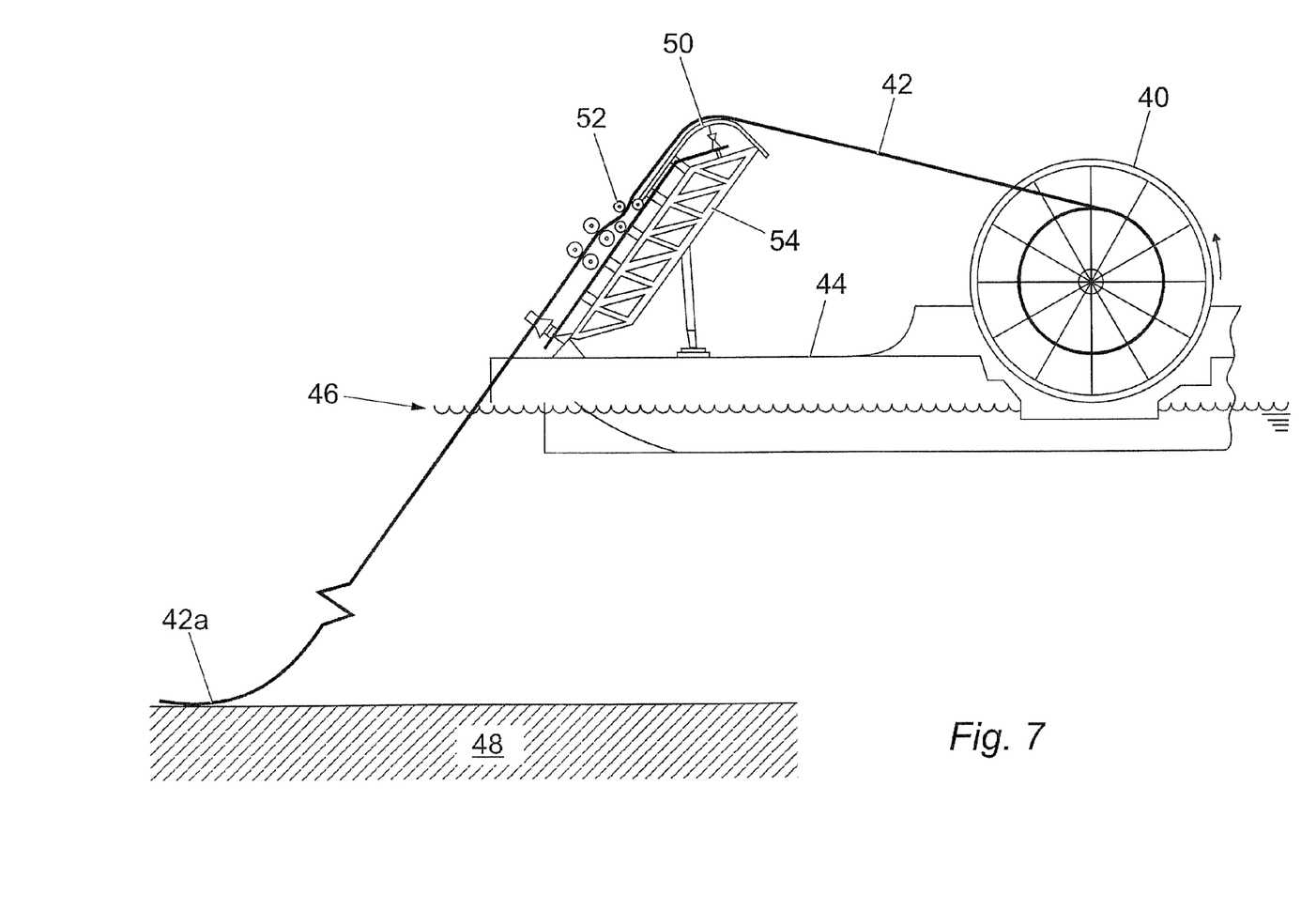
FIG. 7 is a diagrammatic cross-sectional view of a method of unspooling and laying an MLPL from a reel.

FIG. 7 shows a method of directly and simply unspooling the spooled MLPL 42 from the reel 40 located on a suitable vessel 44 at a sea surface 46, to a seabed 48; generally known as the reeled lay method. According to the present invention, the method of unspooling the MLPL 42 from the reel 40 can be carried out in the complete or substantial absence of internal pressure above ambient pressure in the MLPL 42, making the process simple and relatively fast.

The unspooled MLPL 42 provides a laid marine pipeline 42a after it has been straightened by passing through an aligner 50 and one or more straighteners 52 such as trough tensioners prior to passing below the vessel 44 to be laid on the seabed 48.

Pre-commissioning of the laid MLPL 42a usually involves pressurising the laid MLPL 42a. Such pressurising can generally be provided by passing a pressurised fluid such as water along the laid pipeline 42a, an example being hydrotesting that is provide during a pre-commissioning process for a marine pipeline, generally at a pressure such as 30-40 MPa for example. If necessary or desired, the pre-commissioning may also involve the passage of a wrinkle-reducer such as a mandrel (not shown) along the laid MLPL 42a to height-reduce any wrinkles greater than 2 mm high.

The pre-commissioning can comprise a step of hydrotesting in which the internal pressure applied during the hydro test is according to the codes. The hydrotest pressure may be related to the host pipe diameter, and to the wall thickness of the liner. For example, a maximum hydro test pressure can be calculated by the formula (III):

$$p = 0.96 \times 2 \times SMYS \times t/ID \quad (III)$$

wherein;

SMYS is the specified minimum yield stress at the test temperature;

ID is the inner diameter of the pipe; and t is the liner wall thickness.

Either after straightening and/or after such pressurising, wrinkles in the unspooled MLPL 42 have been at least reduced to having a height of <0.5 mm, so as to provide a laid MLPL 42a having the same or similar interference contact stress as the pre-spooled MLPL shown in FIG. 3.

By being able to spool and/or unspool a MLPL onto a reel without requiring the MLPL to have an internal pressure such as that shown in WO2008/072970, the spooling and/or unspooling process can be carried out at a much faster rate than conventionally performed, reducing the OPEX for such operations, and thus the overall time required to lay an MLPL. Where such MLPLs are many kilometres long, this provides a significant operational time and cost saving, based on significantly simpler methods as described herein above.

Various modifications and variations to the described embodiment of the invention will be apparent to those skilled in the art without departing from the scope of the invention as defined in the appended claims. Although the invention has been described in connection with a specific preferred embodiment, it should be understood that the invention as claimed should not be unduly limited to such specific embodiment.

What is claimed is:

1. A method of manufacturing a mechanically lined pipe (MLP) having an outer pipe and an inner liner comprising at least the steps of:
    (a) forming the outer pipe as a single length;
    (b) forming the inner liner former being wholly or substantially the same length as the outer pipe of step (a), wherein the inner liner is a metallic liner;
    (c) locating the inner liner former of step (b) within the outer pipe; and
    (d) expanding the inner liner former within the outer pipe to form the MLP.

2. A method as claimed in claim 1 wherein the MLP is >500 m long.

3. A method as claimed in claim 1 wherein step (a) comprises welding a plurality of outer pipe stalks together.

4. A method as claimed in claim 3 comprising welding the outer pipe stalks together using consumables of outer pipe material.

5. A method as claimed in claim 1 further comprising the step of;
    (e) coating the MLP.

6. A method as claimed in claim 1 wherein the MLP comprises a carbon steel outer pipe.

7. A method as claimed in claim 1 wherein the inner liner is a clad liner.

8. A method as claimed in claim 7 wherein the clad liner has a thickness >2.5 mm.

9. A method as claimed in claim 7 wherein the clad liner has a thickness defined by formula (I)

$$D/t + 1406 \, D/R = 96.1 \quad (I)$$

wherein:

D is the clad liner diameter;

R is the smallest bending radius of a reel; and t is the thickness of the clad liner.

10. A method as claimed in claim 7 wherein the clad liner has a thickness at least equal to the minimum liner thickness "t" calculated by formula two (II):

$$t = a_{00}(\epsilon D^{0.75})^0 g^0 + a_{01}(\epsilon D^{0.75})^0 g^1 + a_{10}(\epsilon D^{0.75})^1 g^0 + a_{11}(\epsilon D^{0.75})^1 g^1 + a_{20}(\epsilon D^{0.75})^2 g^0 + a_{21}(\epsilon D^{0.75})^2 g^1 + 0.16 \quad (II)$$

wherein:

t is the minimum liner thickness in mm:

$a_{00}, a_{01}$, are constants defined by Table 1:

| ij | $a_{ij}$ |
|----|----------|
| 00 | 2.39846 |
| 01 | −0.239488 |
| 10 | −5.48161 |
| 11 | 2.35153 |
| 20 | 6.50598 |
| 21 | −1.37840 |

ϵ is the maximum reeling strain, g is the radial insertion gap in mm, and $D = D_H − 2t_H$ is the liner outer diameter in mm, where and $D_H$ and $t_H$ are respectively the outer diameter and wall thickness of the host or outer pipe of the MLP in mm.

11. A method as claimed in claim 7 wherein the clad liner is alloy 316L, 825, 625 or 904L.

12. The method as claimed in claim 7 wherein the cland liner has a thickness >3 mm.

13. A mechanically lined pipe whenever formed according to the method of claim 1.

14. A method of manufacturing a mechanically lined pipeline comprising conjoining a plurality of mechanically lined pipes as claimed in claim 13.

15. A mechanically lined pipeline whenever formed according to the method of claim 14.

16. A method of reel-laying a mechanically lined pipeline (MLPL) as defined in claim 15 comprising at least the steps of:
   (i) spooling the MLPL onto a reel in the complete or substantial absence of internal pressure above ambient pressure in the MLPL;
   (ii) unspooling the MLPL from the reel; and
   (iii) straightening the unspooled MLPL of step (ii) to provide an MLPL for laying.

17. A method as claimed in claim 16 comprising the step of:
   (ii) unspooling the MLPL from the reel in the complete or substantial absence of internal pressure above ambient pressure in the MLPL.

18. A method as claimed in claim 16 further comprising the step of:
   (iv) pressurising the MLPL after laying.

19. A method as claimed in claim 18 wherein step (iv) comprises hydrotesting the MLPL.

20. A method as claimed in claim 16 wherein the unspooled MLPL of step (ii) has the same or similar interference contact stress as the pre-spooled MLPL before step (i).

21. A method of manufacturing and laying a mechanically lined pipeline (MLPL) in a marine environment and formed from a plurality of mechanically lined pipes (MLPs), the method comprising at least the steps of;
   (a) forming the outer pipe of an MLP as a single length;
   (b) forming the inner liner former of an MLP being wholly or substantially the same length as the outer pipe of step (a), wherein the inner liner is a metallic liner;
   (c) locating the inner liner former of step (b) within the outer pipe;
   (d) expanding the inner liner former within the outer pipe to form an MLP having an inner liner;
   (e) conjoining a plurality of MLPs of step (d) to form an MLPL;
   (f) spooling the MLPL onto a reel; and
   (g) unspooling and straightening the spooled MLPL of step (f) to lay the MLPL in a marine environment.

22. The method of claim 21, wherein spooling the MLPL onto a reel is carried out in complete or substantial absence of internal pressure above ambient pressure in the MLPL.

23. The method of claim 21, further comprising hydrotesting the laid MLPL of step (g) to reduce any residual wrinkles in the MLPL to a height <6 mm.

24. A method of reel-laying a mechanically lined pipeline (MLPL) as defined in claim 15 comprising at least the steps of:
   (i) spooling the MLPL onto a reel resulting in the formation of wrinkles in the spooled MLPL;
   (ii) unspooling the MLPL from the reel; and
   (iii) straightening the unspooled MLPL of step (ii) to provide an MLPL for laying.

25. A method as claimed in claim 1 wherein the MLP is 800 m to 1200 m long.

* * * * *

UNITED STATES PATENT AND TRADEMARK OFFICE
CERTIFICATE OF CORRECTION

PATENT NO. : 8,905,675 B2
APPLICATION NO. : 13/518162
DATED : December 9, 2014
INVENTOR(S) : Daniel Bertaso et al.

It is certified that error appears in the above-identified patent and that said Letters Patent is hereby corrected as shown below:

In the Claims

Column 12

In Claim 10, line 59, please delete the word "and"

Claim 10, line 59 should read as follows:

--$D = D_H - 2t_H$ is the liner outer diameter in mm, where $D_H$--

In Claim 12, line 64, please delete the word "cland" and replace with --clad--

In Claim 12, line 65, please delete the symbol ">" and replace with --$\geq$--

Claim 12 should read as follows:

--The method as claimed in claim 7 wherein the clad liner has a thickness $\geq$ 3mm.--

Signed and Sealed this
Fifteenth Day of September, 2015

Michelle K. Lee
*Director of the United States Patent and Trademark Office*